United States Patent
Chowdhary et al.

(10) Patent No.: US 8,732,090 B2
(45) Date of Patent: May 20, 2014

(54) OPTIMIZING PROCUREMENT SPEND COMPLIANCE

(75) Inventors: Pawan R. Chowdhary, Montrose, NY (US); Amit Dhurandhar, Yorktown Heights, NY (US); Markus R. Ettl, Ossining, NY (US); Soumyadip Ghosh, Peekskill, NY (US); Bruce C. Graves, Yorktown, NY (US); William S. Schaefer, Durham, NC (US); Karthik Sourirajan, White Plains, NY (US); Yu Tang, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 13/339,626

(22) Filed: Dec. 29, 2011

(65) Prior Publication Data
US 2013/0173493 A1 Jul. 4, 2013

(51) Int. Cl.
*G06Q 40/00* (2012.01)

(52) U.S. Cl.
USPC ............................................. 705/80; 705/35

(58) Field of Classification Search
USPC .......................................... 705/80, 35, 7, 10
See application file for complete search history.

(56) References Cited

U.S. PATENT DOCUMENTS

| | | | | |
|---|---|---|---|---|
| 8,306,885 | B2 * | 11/2012 | Brose et al. | 705/35 |
| 2008/0065471 | A1 * | 3/2008 | Reynolds et al. | 705/10 |
| 2009/0182594 | A1 * | 7/2009 | Choubey | 705/7 |
| 2010/0114784 | A1 * | 5/2010 | Sandholm et al. | 705/80 |

OTHER PUBLICATIONS

Wikpedia, the Bayesian information criterion (BIC) or Schwarz criterion (also SBC, SBIC), 1978 and ff., 3 pp.*
Kirit Pandit and Haralambos Marmanis. "Spend Analysis, The Window into Strategic Sourcing", J. Ross Publishing, Ft. Lauderdale, Fl., 2008, pp. 220-229.
Aberdeen Group, "Best Practices in Spending Analysis—Cure for Corporate Epidemic", Sep. 2004.
Singh et al. "Automated cleansing for spend analytics" Proceedings CIKM '05 Proceedings of the 14th ACM International Conference on Information and Knowledge Management.
Greenfield, "Spend Analysis: The First Step in Strategic Sourcing", Proceedings 90th Annual International Supply Chain Conference, May 2005.
Bartels, "Spend Analysis: Key App, Few Vendors" Forrester Research, Jul. 19, 2004, http://www.forrester.com/rb/Research/spend_analysis_key_app,_few_vendors/q/id/34930/t/2.
Meila et al., "An Experimental Comparison of Several Clustering and Initialization Methods" In Machine Learning, 1998, pp. 386-395.
Schwarz, "Estimating the Dimensions of a Model". Annals of Statistics, 1978, 461-464, 6 (2).

* cited by examiner

*Primary Examiner* — Charles Kyle
*Assistant Examiner* — Siegfried E Chencinski
(74) *Attorney, Agent, or Firm* — Scully, Scott, Murphy & Presser, P.C.; Daniel P. Morris, Esq.

(57) ABSTRACT

Managing spend compliance may include receiving a set of spend transaction records containing one or more spend attributes, one or more compliance business rules and one or more investment scenarios that increase spend compliance. The compliance business rules may be applied to the transaction records and segments of transactions with predetermined high savings opportunities may be determined. A prioritized investment plan over one or more time periods that yield optimized return on investment may be generated based on applying the segments of transactions and the investment scenarios.

17 Claims, 10 Drawing Sheets

| COST - FIXED | MARKETING & SALES | LOGISTICS | FOOD SERVICE EQUIPMENT | HUMAN RESOURCES | IT HARDWARE | IT SOFTWARE | FLEET | MRO / OPERATING SUPPLIES | BENEFITS & INSURANCE | FACILITIES MANAGEMENT |
|---|---|---|---|---|---|---|---|---|---|---|
| LEVERAGE SPEND - V1 | $30,000 | $30,000 | $30,000 | $30,000 | $30,000 | $30,000 | $30,000 | $30,000 | $30,000 | $30,000 |
| LEVERAGE SPEND - V2 | $30,000 | $30,000 | $30,000 | $30,000 | $30,000 | $30,000 | $30,000 | $30,000 | $30,000 | $30,000 |
| LEVERAGE SPEND - V3 | $30,000 | $30,000 | $30,000 | $30,000 | $30,000 | $30,000 | $30,000 | $30,000 | $30,000 | $30,000 |
| LEVERAGE SPEND - V4 | $30,000 | $30,000 | $30,000 | $30,000 | $30,000 | $30,000 | $30,000 | $30,000 | $30,000 | $30,000 |
| LEVERAGE SPEND - V5 | $30,000 | $30,000 | $30,000 | $30,000 | $30,000 | $30,000 | $30,000 | $30,000 | $30,000 | $30,000 |
| LEVERAGE SPEND - V6 | $30,000 | $30,000 | $30,000 | $30,000 | $30,000 | $30,000 | $30,000 | $30,000 | $30,000 | $30,000 |
| LEVERAGE SPEND - V7 | $37,500 | $37,500 | $37,500 | $37,500 | $37,500 | $37,500 | $37,500 | $37,500 | $37,500 | $37,500 |
| LEVERAGE SPEND - V8 | $37,500 | $37,500 | $37,500 | $37,500 | $37,500 | $37,500 | $37,500 | $37,500 | $37,500 | $37,500 |
| LEVERAGE SPEND - V9 | $47,500 | $47,500 | $47,500 | $47,500 | $47,500 | $47,500 | $47,500 | $47,500 | $47,500 | $47,500 |
| LEVERAGE SPEND - V10 | $60,000 | $60,000 | $60,000 | $60,000 | $60,000 | $60,000 | $60,000 | $60,000 | $60,000 | $60,000 |
| COST - VARIABLE (% OF SPEND) | MARKETING & SALES | LOGISTICS | FOOD SERVICE EQUIPMENT | HUMAN RESOURCES | IT HARDWARE | IT SOFTWARE | FLEET | MRO / OPERATING SUPPLIES | BENEFITS & INSURANCE | FACILITIES MANAGEMENT |
| LEVERAGE SPEND - V1 | 0.75% | 1.00% | 1.00% | 1.00% | 1.00% | 1.00% | 1.00% | 1.00% | 1.00% | 1.00% |
| LEVERAGE SPEND - V2 | 0.75% | 1.00% | 1.00% | 1.00% | 1.00% | 1.00% | 1.00% | 1.00% | 1.00% | 1.00% |
| LEVERAGE SPEND - V3 | 0.75% | 1.00% | 1.00% | 1.00% | 1.00% | 1.00% | 1.00% | 1.00% | 1.00% | 1.00% |
| LEVERAGE SPEND - V4 | 0.75% | 1.00% | 1.00% | 1.00% | 1.00% | 1.00% | 1.00% | 1.00% | 1.00% | 1.00% |
| LEVERAGE SPEND - V5 | 0.75% | 1.00% | 1.00% | 1.00% | 1.00% | 1.00% | 1.00% | 1.00% | 1.00% | 1.00% |
| LEVERAGE SPEND - V6 | 0.75% | 1.00% | 1.00% | 1.00% | 1.00% | 1.00% | 1.00% | 1.00% | 1.00% | 1.00% |
| LEVERAGE SPEND - V7 | 0.85% | 1.10% | 1.10% | 1.10% | 1.10% | 1.10% | 1.10% | 1.10% | 1.10% | 1.10% |
| LEVERAGE SPEND - V8 | 0.85% | 1.10% | 1.10% | 1.10% | 1.10% | 1.10% | 1.10% | 1.10% | 1.10% | 1.10% |
| LEVERAGE SPEND - V9 | 1.05% | 1.30% | 1.30% | 1.30% | 1.30% | 1.30% | 1.30% | 1.30% | 1.30% | 1.30% |
| LEVERAGE SPEND - V10 | 1.15% | 1.45% | 1.45% | 1.45% | 1.45% | 1.45% | 1.45% | 1.45% | 1.45% | 1.45% |

FROM FIG. 3A

| SCHEME A - % OF SPEND BENEFITS FROM IMPROVEMENT* | MARKETING & SALES | LOGISTICS | FOOD SERVICE EQUIPMENT | HUMAN RESOURCES | IT HARDWARE | IT SOFTWARE | FLEET | MRO / OPERATING SUPPLIES | BENEFITS & INSURANCE | FACILITIES MANAGEMENT |
|---|---|---|---|---|---|---|---|---|---|---|
| LEVERAGE SPEND - V1 | 0.00% | 0.00% | 0.00% | 0.00% | 0.00% | 0.00% | 0.00% | 0.00% | 0.00% | 0.00% |
| LEVERAGE SPEND - V2 | 0.00% | 0.00% | 0.00% | 0.00% | 0.00% | 0.00% | 0.00% | 0.00% | 0.00% | 0.00% |
| LEVERAGE SPEND - V3 | 0.00% | 0.00% | 0.00% | 0.00% | 0.00% | 0.00% | 0.00% | 0.00% | 0.00% | 0.00% |
| LEVERAGE SPEND - V4 | 0.00% | 0.00% | 0.00% | 0.00% | 0.00% | 0.00% | 0.00% | 0.00% | 0.00% | 0.00% |
| LEVERAGE SPEND - V5 | 0.00% | 0.00% | 0.00% | 0.00% | 0.00% | 0.00% | 0.00% | 0.00% | 0.00% | 0.00% |
| LEVERAGE SPEND - V6 | 0.00% | 0.00% | 0.00% | 0.00% | 0.00% | 0.00% | 0.00% | 0.00% | 0.00% | 0.00% |
| LEVERAGE SPEND - V7 | 10.00% | 10.00% | 10.00% | 10.00% | 10.00% | 10.00% | 10.00% | 10.00% | 10.00% | 10.00% |
| LEVERAGE SPEND - V8 | 11.00% | 11.00% | 11.00% | 11.00% | 11.00% | 11.00% | 11.00% | 11.00% | 11.00% | 11.00% |
| LEVERAGE SPEND - V9 | 11.50% | 11.50% | 11.50% | 11.50% | 11.50% | 11.50% | 11.50% | 11.50% | 11.50% | 11.50% |
| LEVERAGE SPEND - V10 | 11.75% | 11.75% | 11.75% | 11.75% | 11.75% | 11.75% | 11.75% | 11.75% | 11.75% | 11.75% |

FIG. 3B

- SPEND DATA OVERVIEW
  - 125,000 TRANSACTIONS (3Q AND 4Q 2010)
  - $ 325 M SPEND
  - 32 PRODUCT GROUPS
  - 6 BUSINESS UNITS (CARS, VAN, TRUCK, CPO, SALES, ETC)
  - APPROX. 5,000 SUPPLIERS
  - OVER 1,100 BUYERS

- DIMENSIONS:
  - INVOICE AMOUNT
  - BUYER NAME
  - ORGANIZATION UNIT
  - SUPPLIER
  - PRODUCT GROUPS (LOGISTICS, MARCOM, TRAVEL,...)

- NON-LEVERAGED SPEND:
  - $305 M (94 PERCENT)
  - NO CONTRACT

- RULES:
  - TRANSACTION IS COMPLIANT:
    - IF PO NUMBER IS AVAILABLE
    - IF NO PO NUMBER, PURCHASE IS FOR APPROVED CATEGORY CODE

Segmentation Result:

| Segments | Spend Transactions | Procurement Spend (%) | Procurement Spend | Average Spend per Transaction | Non Compliance Spend | Business Unit | Requestor | Material Description | Vendor Name |
|---|---|---|---|---|---|---|---|---|---|
| Segment-1 | 27731 (19.0%) | ◐ | $188,235,80 (57.47%) | $6,787 | $183,834,673 (97.66%) | Business Unit (ABC Auto Vans) 33.32% | Requestor 11.95% | Material Description (Marketing & Sales) 46.93% | Vendor Name WT 20.2% |
| Segment-2 | 40977 (28.1%) | ◔ | $69,264,140 (21.15%) | $1,690 | $64,303,151 (92.83%) | Business Unit (ABC Auto Corporate) 44.96% | Requestor 11.75% | Material Description (Logistics) 71.9% | Vendor Name OR 14.67% |
| Segment-3 | 20163 (13.9%) | ◔ | $25,059,218 (7.66%) | $1,242 | $24,752,936 (98.77%) | Business Unit (ABC Auto SUV) 91.8% | Requestor 32.15% | Material Description (MRO/ Operating Sup) 35.71% | Vendor Name C 18.04% |
| Segment-4 | 28858 (19.8%) | ◔ | $25,092,709 (7.67%) | $869 | $23,609,244 (94.08%) | Business Unit (ABC Auto Corporate) 86.44% | Requestor 22.74% | Material Description (Fleet) 27.15% | Vendor Name IE 14.77% |
| Segment-5 | 28234 (19.4%) | ◔ | $19,892,547 (6.08%) | $704 | $18,000,793 (90.49%) | Business Unit (ABC Auto Corporate) 99.27% | Requestor 26.58% | Material Description (Marketing & Sales) 66.44% | Vendor Name 20.13% |

[<<Back] [Next>>]

702 — Non Compliance Spend
704 — Procurement Spend

FIG. 7

Create Optimization

Optimization Name: [ Seg 1 - Inc. compliance to 80pct ]

Scenario Name: Demo-2

Segment Name(s): Segment-1

Please select one compliance objective:

- ⦿ Maximize ROI while achieving a compliance target
- ○ Maximize ROI for a given budget Budget/Compliance Target: [ 80 ]

[ << Advanced Visibility Analytics ]　[ << Back ]　[ Run Optimization ]

FIG. 8

OPTIMIZING PROCUREMENT SPEND COMPLIANCE

FIELD

The present application relates generally to computers, computer systems, optimization and more particularly to optimizing procurement spend compliance.

BACKGROUND

Often the processes for purchasing commodities and services within a business enterprise are centralized into a procurement organization. These purchases are frequently sourced from one or more suppliers, or vendors, based on contract terms and conditions (such as price, payment terms and others), availability, and quality or legacy habit of purchasing service with known vendors. The inventors in the present disclosure have found that many organizations lack appropriate processes and disciplines to drive demand to preferred suppliers. Thus these enterprises are unable to leverage the value of the pre-negotiated contracts due to lack of process education, approval process steps or appropriate purchasing tools that could result in amounts of spending that would be considered not compliant (not being sourced through preferred suppliers). Depending upon the size of the organization, such transactions may involve significant amount of cost. Manually sifting or employing typical query tools to review large amounts of spend transaction data with multiple attributes to identify the level of non compliant spend and identify areas to take action is a daunting task.

For example, the fundamental monetary units of analysis in an enterprises can be characterized into two major parts; spend and revenue. Companies generate revenue by selling goods or services. The cost to the company to generate revenue can be broadly classified as spend. This can come in the form of buying raw-materials as input to the goods or services being sold for manufacturing oriented companies to the technology services, software, hardware and salaries to personnel for non-manufacturing entities.

The types of spending generally can be classified into direct spending (e.g., cost of goods sold, for instance, that impacts the product being manufactured such as raw materials, computer memory chip) and indirect spending (e.g., sales, general and administrative expenses such as office supplies, maintenance services, travel, marketing, communication and others). This spending is often sourced from multiple suppliers/vendors and many organizations may negotiate contracts with suppliers that determine service levels, quality, price, and other terms. Some contracts provide back-end rebates where the purchasing organization qualifies for a percentage of spend as a rebate when it achieves a predetermined spend target, or special pricing for volume spend. Procurement spend can run into large amount, but only very few companies have implemented proper processes to audit and monitor critical procurement purchases. Some organizations might have a level of visibility and control over a few procurement products that are core to their business, but beyond this the majority of procurement activities are ad-hoc in nature with minimal supervision. This can lead to severe spend leakage that often goes unnoticed due to lack of visibility or appropriate processes and controls.

The types of procurement data that are typically available are purchase orders (PO), invoices, preferred suppliers lists, supplier contracts, and general ledger entries. There are tools available in the market that process PO and invoice transactions and provide spend visibility along a few standard dimensions such as product, vendor, organization. Such tools often have a built-in rules engine to assess the quality of the data, cleanse and classify the data to standardize the vendor and product categories and also identify the PO data as compliant spend (established process) or non-compliant spend (ad-hoc spend). However, these are mainly reporting tools that provide drill-down visibility into spending across few dimensions, but they do not have capabilities to deep dive into data and determine the most problematic spend areas across a large number of dimensions. For example, today's spend analysis tools can help procurement managers to identify top non-compliant spend by vendor and product, but they do not further differentiate spend within one dimension by other attributes or provide further analysis into different areas of non-compliant spending across several dimensions. Thus, it often remains unclear where an organization should focus its attention to maximize the return on investment (ROI) when faced with non-compliance.

BRIEF SUMMARY

A method for managing spend compliance, in one aspect, may include receiving a set of spend transaction records containing one or more spend attributes. The method may also include receiving one or more compliance business rules. The method may further include receiving one or more investment scenarios that increase spend compliance. The method may also include applying the compliance business rules to said transaction records and determining segments of transactions with predetermined high savings opportunities. The method may further include applying said segments of transactions and said investment scenarios and generating a prioritized investment plan over one or more time periods that yield optimized return on investment.

A system for managing spend compliance, in one aspect, may include an information integration service module operable to receive a set of spend transaction records containing one or more spend attributes, and receive one or more compliance business rules. A visibility analytics module may be operable to apply the compliance business rules to said transaction records and determine segments of transactions with predetermined high savings opportunities. A compliance analytics module may be operable to apply said segments of transactions and one or more investment scenarios, and generate a prioritized investment plan over one or more time periods that yield optimized return on investment.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 3A and 3B show an example of how to capture the cost benefit data.

FIG. 5 shows an example of high levels of non-compliance at an example company.

FIG. 6 shows a dashboard interface in one embodiment of the present disclosure.

FIG. 7 shows an example of results of the advanced visibility analytics in one embodiment of the present disclosure.

FIG. 8 shows a user interface that may be used to create a compliance optimization scenario in one embodiment of the present disclosure.

DETAILED DESCRIPTION

One embodiment of the present disclosure discloses the ability to manage and control the procurement spending. For example, a methodology and/or system in one embodiment of the present disclosure may provide spend compliance analytics that includes measurements of cost savings due to increased compliance and identification of areas where spend tends to be non-compliant. In one aspect, such a methodology and/or system may be embodied as a software tool, for instance, a web enabled analytical solution referred to in this disclosure as Compliance Analytics Tool (CAT). CAT in one embodiment may embed a two phase methodology for compliance management. In the first phase, an advanced data mining techniques may be employed to segment a large amount of historical spend transactions to identify promising areas of improvement, exploiting a multitude of purchasing attributes such as business unit, procurement category, suppliers, and others. The second phase may employ portfolio optimization techniques to further focus on specific segments that provide maximum benefit based on desired compliance targets or available budget. In another aspect, solution architecture may be provided that integrates business analytics along with business intelligence tools, dashboards, and data warehousing.

As an example, the Compliance Analytics Tool (CAT), in one embodiment of the present disclosure, may be implemented as a web-based solution that uses SPSS, iLOG, and Cognos business intelligence (BI) capabilities to provide data mining analytics to segment the spend transactions across several dimensions. Examples of dimensions may include business units, product category, vendor, requester, profit and cost center, and others. IBM® SPSS® Statistics is a predictive analytics tools. iLog and Cognos are business rule management systems. The methodology of the present disclosure also may identify focus areas for compliance improvement using portfolio optimization techniques to determine the highest ROI for a given compliance target or investment. Furthermore the solution may provide scenario management capabilities to create appropriate scenarios to evaluate spending using a mix of dimensions to segment the data space appropriately. In addition, it may also create optimization scenarios on top of each segmentation scenario to determine the right investment strategy to increase compliance and obtain maximized ROI.

The analytical modules (also referred to as engines or components) in CAT in one embodiment are designed to quickly identify areas of non-compliance that are most relevant, and subsequently determine the highest savings potential given an overall compliance or investment target. This approach in one embodiment may include a two-phase compliance analytics process which is described in detail below.

Two-Phase Compliance Analytics Process

Figure 1:
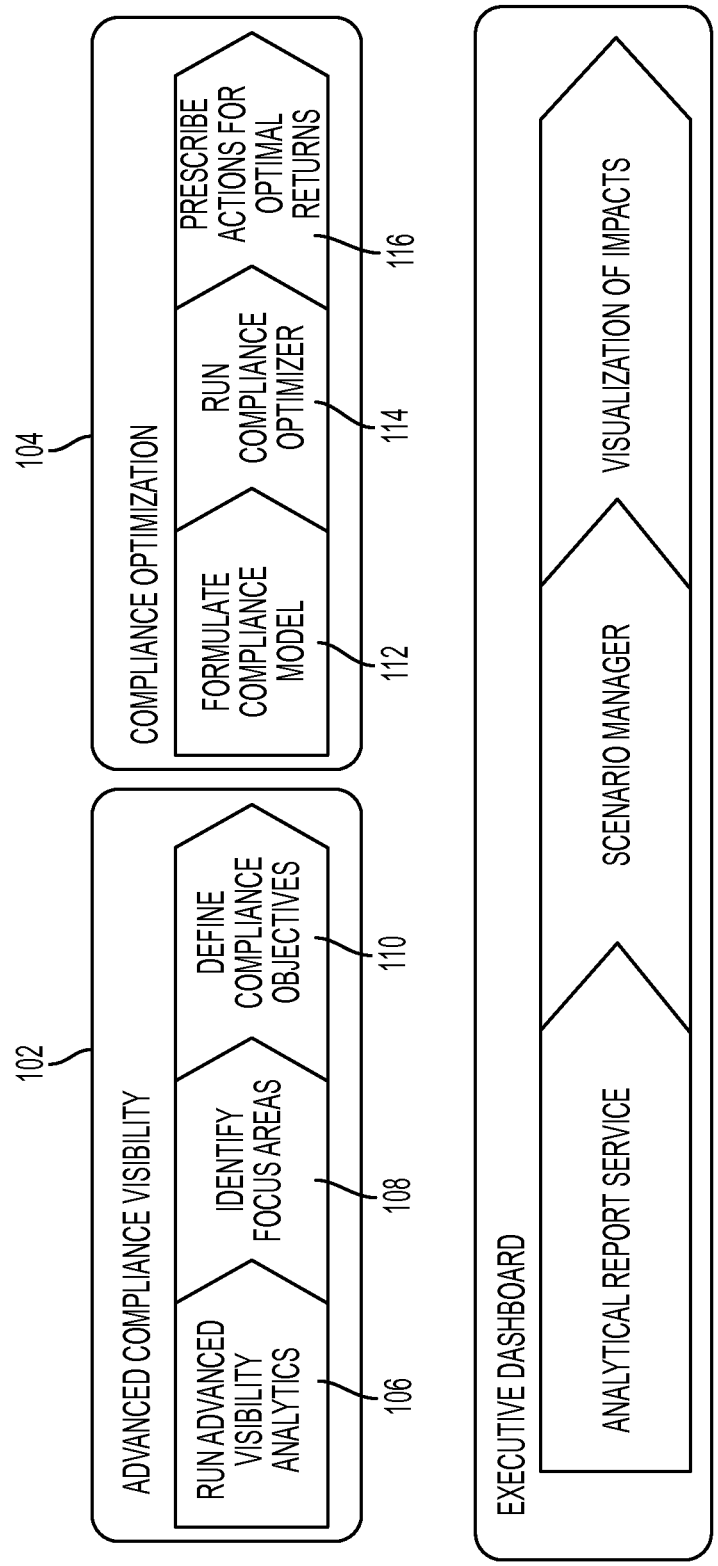
FIG. 1 illustrates a two phase methodology to manage the spend compliance in one embodiment of the present disclosure.

FIG. 1 illustrates a two phase methodology to manage the spend compliance in one embodiment of the present disclosure. The first phase may include an advanced compliance visibility method 102 that dives deep into spend transaction data using statistical segmentation and clustering techniques. The second step may include a compliance optimization method 104 that employs portfolio optimization techniques to determine optimal savings given a compliance or budget objective, along with cost/benefit data and segment data from the first phase.

Advanced Compliance Visibility

An Advanced Compliance Visibility module 102 in one embodiment points out areas that are highly non-compliant across several spend dimensions. In one aspect, user defined parameters may be used to mine client transactional data to find "clusters" of non-compliant transactions. Examples of user defined parameters may include dimensions that can be used to segment data to determine the focus area for improving compliance; for instance, one or more business units, products, vendors, profit centers may be selected by users to segment the transaction data. Clusters of opportunity may be identified automatically using statistical techniques, saving time and manual effort. The module 102 may further inform the user of factors/features most likely lead to the observed non-compliance.

The module 102 may be implemented in SPSS® and use a two-step clustering approach to highlight areas that need further attention. Briefly, SPSS® is software for performing data mining and statistical analysis. The distance measure used in clustering in one embodiment may be log-likelihood. Since the data mine may include non-numeric string attributes in addition to real valued attributes, log-likelihood, which is effective in such situations, may be employed. In one embodiment of the present disclosure, the Schwarz Bayesian Criteria may be used to decide when to consider different sets of points to signify different clusters. After the clusters have been identified the importance of each feature in every cluster may be calculated by measuring its homogeneity in that cluster. The homogeneity is negatively correlated to the variance of that feature in the particular cluster and higher the homogeneity, greater the coherence and hence more significant the feature. Using such an approach the Advanced Compliance Visibility module 102 of the present disclosure in one embodiment may effectively highlight areas that need attention which are then sent as inputs to the optimization module.

Figure 2:
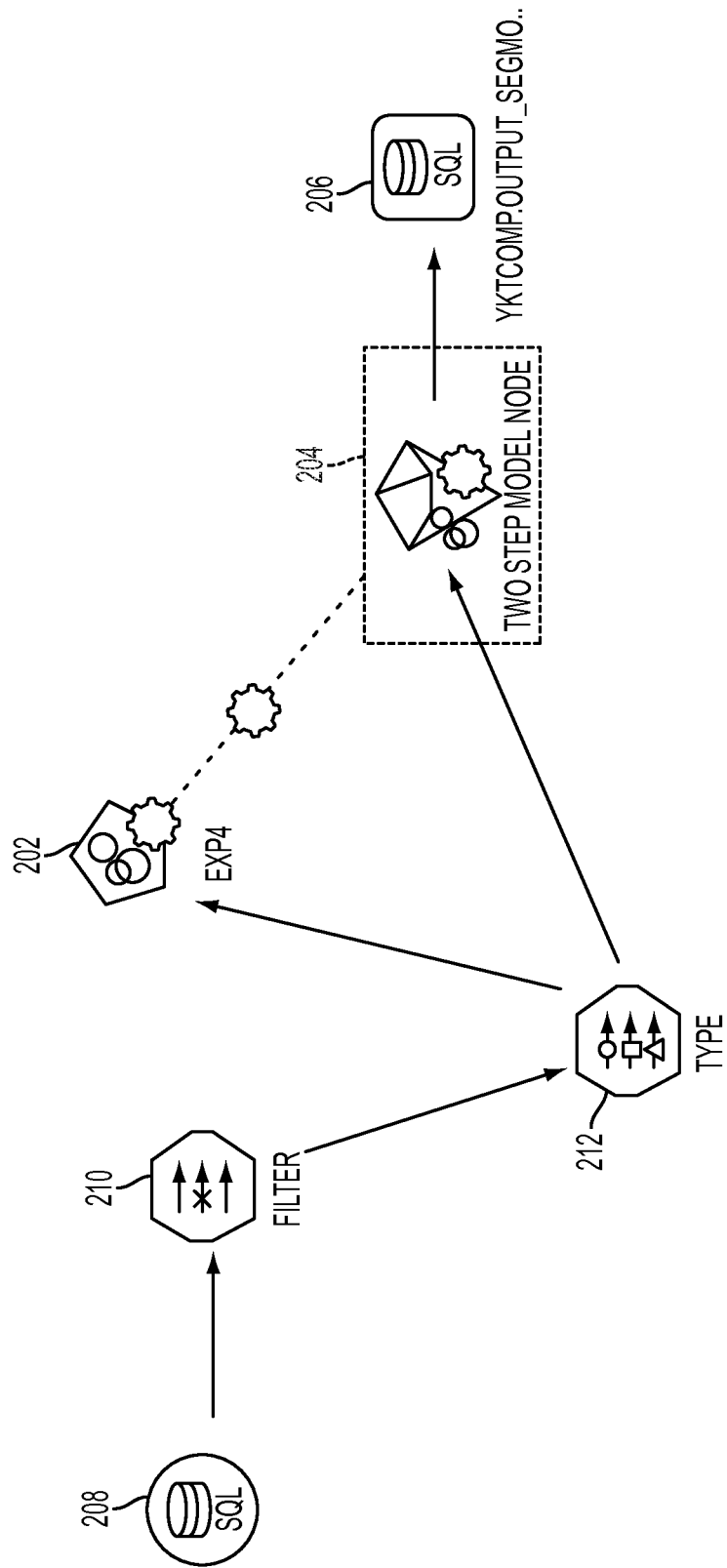
FIG. 2 shows the Advanced Visibility module modeled as stream using the SPSS® Modeler Client.

FIG. 2 shows the Advanced Visibility module modeled as stream using the SPSS® Modeler Client. The parameters for the node such as Structured Query Language (SQL) 208 and Type (dimensions that participate in clustering) 212 can be supplied using a dashboard. A learning node (Exp 4) 202— that is customized in one embodiment—is run that generates the model node (in yellow) and this model 204 may be applied which categorizes each transaction into a specific cluster or segment. In one embodiment, the stream execution is programmatically invoked using the SPSS PS-API which is wrapped into the web services for any client to perform such analysis by passing appropriate parameters, e.g., user defined parameters as discussed above. A SQL node 208 may retrieve the transaction data from the database for segmentation/clustering purpose. A filter node 210 may remove the transactions that have incomplete data such as invoice amount, missing compliance flag, and others. The result of the application of the model 204 on the transaction data results in segmentation of the data that is stored using the SQL node 206.

Referring back to FIG. 1, advanced compliance visibility method may include running advanced visibility analytics 106, identifying focus areas 108, and defining compliance objectives 110. Running advanced visibility analytics 106 may include creating a new advanced visibility scenario using scenario manager dashboard (e.g., shown in FIG. 6), selecting dimensions for segmentation and data to reduce the number of transaction as input to the Advanced Visibility Model and invoking a segmentation function, e.g., by clicking on Run Segmentation button on the dashboard. For example, a scenario is created by selecting dimensions and scope as parameters as show in FIG. 6. The dimensions specify to the SPSS Modeler to identify attributes that will be used to segment the data. Varying selection of the dimensions could result in different sets of segmentation or clusters of the data that is passed to the modeler using the scope parameter. Run Segmentation action invokes the web services which takes the selected input parameters and prepares the model described above that identifies clusters of focus areas, and invokes the stream using PS API. The result of the model execution in one embodiment is the set of segmentations or clusters or focus areas that may be identified at 108. In defining compliance objectives at 110, a user may select one or more focus areas that are of interest in improving the compliance (e.g., shown in FIG. 7) and select an objective, for example, by clicking on "Next" button in FIG. 7, which presents a compliance optimization objective screen (FIG. 8). On this screen, the user may select one of the objectives (e.g., target compliance percentage or budget) and click on "Run Optimization" button. This action invokes another web services that executes the ILOP CPLEX optimization model passing the appropriate parameters, and the results of the run may be stored in the data warehouse and can be viewed using the Cognos BI tool (e.g., shown in FIG. 9).

Compliance Optimization

A compliance optimization module 104 may provide the capability of optimizing the compliance improvement investment strategy. In one embodiment of the present disclosure, multiple optimization models may be supported: e.g., the user can minimize the investment required to achieve a specified compliance target for the entire (or parts of the) organization, or maximize the achievable compliance for a given maximum investment budget, or maximize the return-on-investment given a maximum investment budget and/or minimum compliance target. The cost of investing on compliance monitoring can be specified for any arbitrary part of the organization in terms of fixed investments (e.g., procuring a new compliance tool) or in terms of volume-based costs (e.g., 15-mins to review per transaction). Similarly, the benefit of increased compliance can be fixed or volume-based (e.g., volume discounts offered by preferred suppliers).

Picking the best actions among a set is non-trivial; for example, improving compliance in different categories yields different benefits, and benefits are a function of spend volume, room for improvement and costs. Output of optimization may include what compliance actions to take and/or compliance savings that can be achieved.

Referring to FIG. 1, compliance optimization may include formulating a compliance model 112, running a compliance optimizer 114, and prescribing actions for optimal returns 116. Formulating a compliance model 112 may include specifying what is to be optimized as described above. The compliance optimizer is run at 114, and action plan for optimal returns may be output at 116.

FIGS. 3A and 3B show an example of how to capture the cost benefit data. The figures show three tables (fixed cost 302, variable cost 304 and savings from improvement 306). Each table row defines a compliance level (v1=10%, v2=20%, v10=100%) and the columns define the product categories. For each such combination one can provide the fixed and variable cost to bring the compliance to a particular level and savings that can be obtained to move to that particular compliance level. For example, for product category "Marketing and Sales" 308 the fixed cost to move from level v6 to v7 (60% to 70%) is $37,500 (shown at 310) and variable cost is 0.85% (shown at 312) of spend. The benefit to move to this level is about 10% (shown at 314) of the spend. These costs could represent multiple actions such as introducing new software tool or establishing/enhancing current compliance process or introducing physical monitoring of purchase orders at a certain clip level, and others. Such cost input can be further linked to other dimension such as business units such that each combination has its own cost and savings data that goes as input to the optimization engine.

As an example of an optimization scenario, consider the optimization model that maximizes the return-on-investment (ROI) for a given investment budget. The ROI of a business entity is defined as the increase in benefit derived from higher compliance less the additional investment required achieving the higher compliance. Then, the optimization module identifies a prioritized list of investments to make that are ordered in decreasing order of ROI. The list of all possible such orderings can grow exponentially with the number of business entities considered, as well as with the granularity of cost and benefit changes. The optimization module formulates each optimization model as a mathematical program called a mixed-integer linear program and uses IBM®'s ILog CPLEX optimization solvers to obtain the optimal solution. This is then converted into a prioritized list of investment options to implement. This module scales well with the number of business entities defined, and can identify candidate optimal solutions for problems with 100's of distinct business entities in a few seconds.

Architecture Overview

Figure 4:
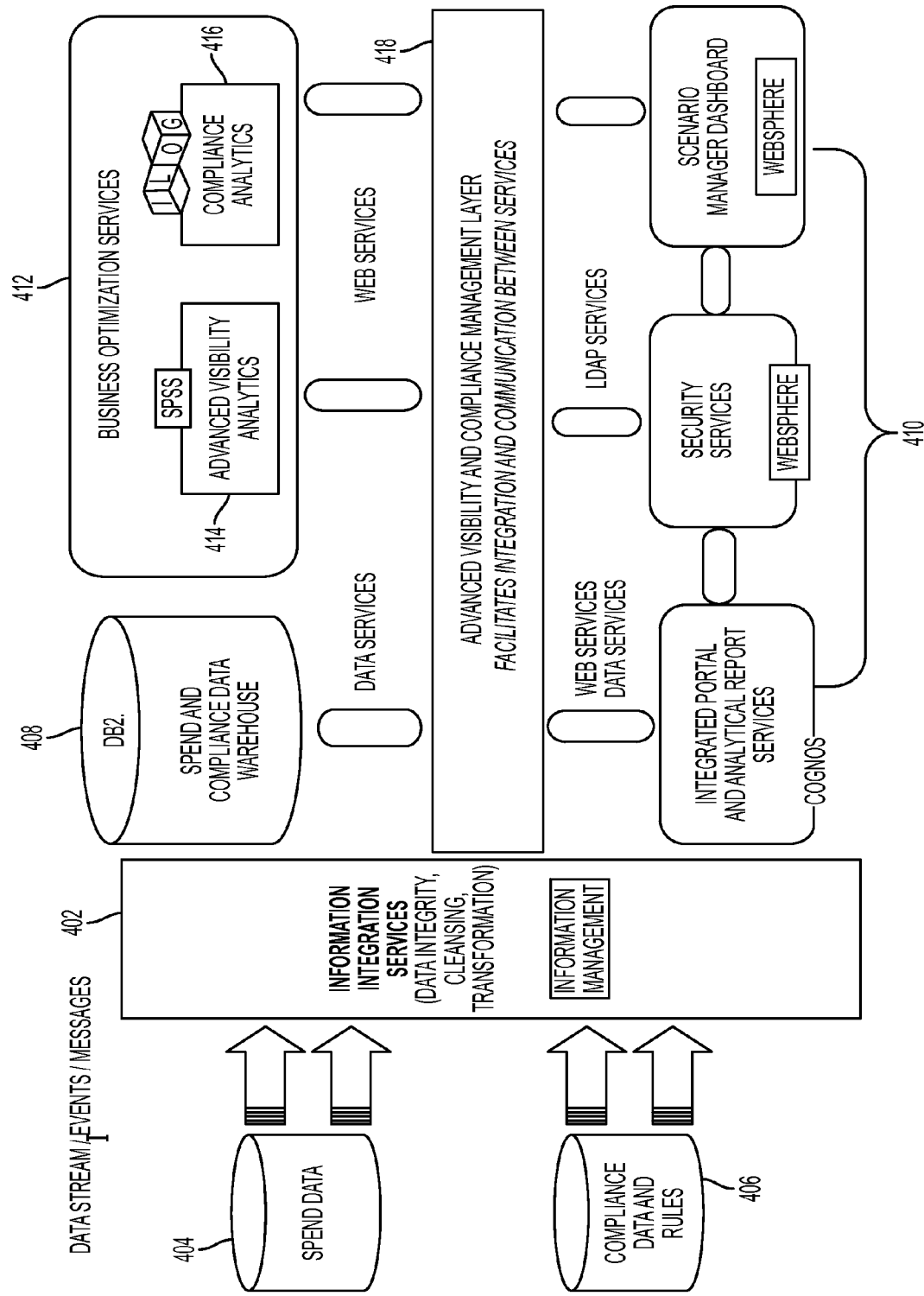
FIG. 4 shows the CAT web based solution architecture as an example.

Various components of the present disclosure may interact with each other to provide a seamless solution experience. FIG. 4 shows the CAT web based solution architecture as an example. In one embodiment, it may be a multi-tiered web enabled service-oriented architecture (SOA) based architecture that comprises of a presentation layer (BI Reports and scenario manager dashboard), a middleware layer (solution management, security component, data access beans, business optimization, and/or other) and a data storage layer (data cleansing component and physical data warehouse).

Information Integration Services 402 in one embodiment receives the spend data 404 such as the invoice and purchase order data, cleanses the data and stores the data in the Spend and Compliance Data Warehouse 408. Other spend data 404 may include preferred suppliers lists, supplier contracts, and general ledger entries. This layer may also apply a set of compliance rules 406 to flag transactions as being compliant. The following illustrates examples of compliance rules:

a) Process Compliance:
   Purchase Order (PO) Date must precede the Invoice Date.
   PO transaction does not pass through the normal purchasing channel (Bypass).
   b) System Compliance:
   Purchase Order number exists unless exempt product category.
   c) Vendor Compliance:
   Vendor Contract number exists for each transaction.

If one or more of the above rules are violated, the transaction may be flagged as non-compliant.

Spend and Compliance Data Warehouse 408 may be a data warehouse that stores the raw PO and Invoice data. The database tables related to analytics and scenario management capabilities may be also stored in this database.

Dashboard component 410 may be a combination of Cognos® BI and Adobe Flex® to deliver BI spend transaction reports as well as reports from two analytical engines, advanced visibility analytics engine 414 and compliance analytics engine 416. The dashboard component 410 may include a scenario manager dashboard, and Cognos BI may embed the scenario manager dashboard to provide an integrated dashboard. The scenario manager allows users to create new analytical scenarios and run them via a user interface.

Business Optimization Services component 412 may include the two analytical engines 414 and 416 for performing visibility analytics and compliance analytics. The engines 414, 416 may be enabled using a web services interface that can be invoked with appropriate parameters.

Management Layer component 418 may link all other components in the architecture and facilitate communication between them as needed. For example, a request to execute an analytics engine 412 via the scenario manager dashboard 410 may be received by this component 418 which in turns executes the analytics and stores the results in the data warehouse 408.

An example use case described below further provides more detail on these components and walk through of the various steps of performing analytics, viewing the analytics results, and identifying areas of improvement that provide the highest return on investment in one embodiment of the present disclosure.

In the example scenario, consider ABC Auto, a fictitious company consisting of several business units (Auto, Truck, Financial Services, etc) that purchase various products and services as part of procurement spend across several suppliers to support the company's business operations. In one embodiment, the first step in the CAT tool may be to obtain PO and Invoice data with a number of standard attributes such as PO Number, Business Units, Geography, Requester, Product Categories, Supplier, PO Date, Invoice Date, Supplier Contract, Profit Center and the dollar amount of spend. The next step may be to store this information in the CAT data warehouse and apply the compliance rules. The data is summarized in FIG. 5.

Traditional Analysis

FIG. 5 shows high levels of non-compliance at this company. A user performing traditional spend analysis would try to identify the business units or product categories for which the non-compliance spend is largest. For instance, FIG. 5 shows spend data, dimensions associated with the spend data, one or more rules for determining compliance, and non-leveraged spend. A spend transaction could be non-leveraged if it violates the rules, e.g., examples of which are discussed above. FIG. 5 shows the high level of non-compliance due to violation of rule "b)" discussed above. Most transaction at this particular client did not contain a PO which could lead to the possible violation of rule "c)" discussed above as this would be the case when a contract has not been placed with a vendor to get the goods at preferred rate.

Analysis Using Analytical Models in CAT Tool

Figure 6:
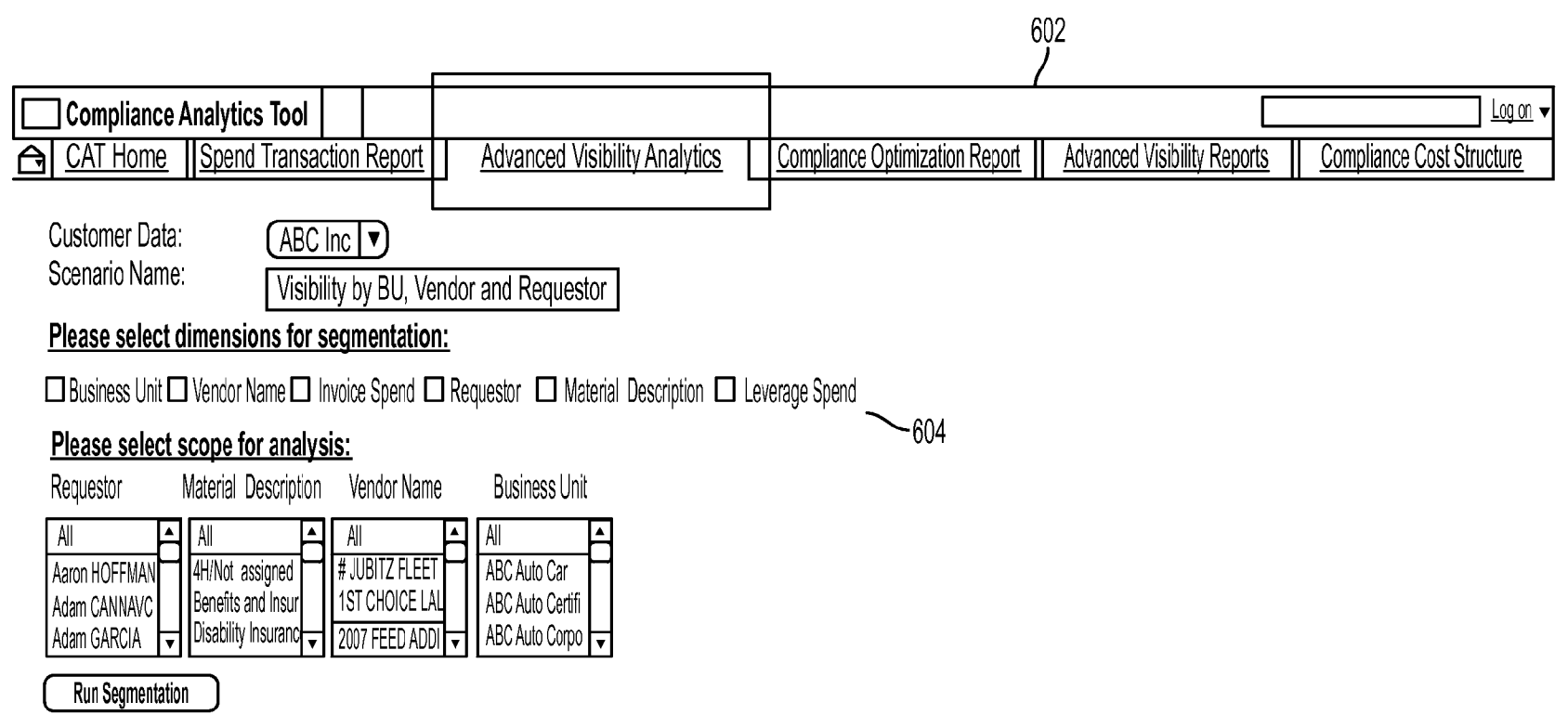

In the present disclosure, to perform spend analysis, the CAT dashboard interface 602 may be utilized, which performs such analysis interactively. For instance, a user may navigate to a web uniform resource locator (URL), select the Advanced Visibility Analytics view and then click on "Create Advanced Visibility Scenario Button" to bring up the screen 604 as shown in FIG. 6.

The user may be asked to enter a scenario name, select a set of dimensions for the segmentation, and define the scope of the data. For illustration, all dimensions and all data are selected for the analysis. Clicking on the "Run Segmentation" button triggers a message to the CAT management layer (e.g., FIG. 4 at 418) which in turns invokes the web services with the segmentation and scope parameters to run the SPSS Model (e.g., FIG. 4 at 414). The results of the advanced visibility analytics are shown in FIG. 7.

The analytics divide the data space into five segments based on the dimensions content and scope of the data. For the current analysis the dimensions considered for segmentation are business units, requestor, product categories, vendor, and compliance indicator. The largest segment with non-compliance spend (blue square) 702 is Segment 1 that comprises of almost 60% of the total spend (red square) 704. In this segment, 97 percent of the transactions are non-compliant. Another characteristic to note is the average dollar amount per transaction of approximately $6,700. This amount is much higher when compared to other clusters. The segment also shows that the ABC Auto Sales business unit accounts for the largest non-compliant spend, with product category "Marketing and Sales" leading the non-compliant spend. For instance, under the features column, the business unit and material description shows the particular values. It also identifies other attributes such as Requestor name and Vendor being responsible for the largest non-compliant spend in this segment. In one embodiment, the spend attributes within each cluster are independent of the other attributes, and the figure displays the top contributors of a particular dimension. For example, the requester may not be directly responsible for the largest spend within the Auto Sales business unit.

The advanced visibility analysis results may be stored in the CAT data warehouse for further analysis using the BI reporting capabilities of the tool (Cognos) where ABC Auto sales can be linked to other dimensions such as product categories or Requestor or Vendors for non-compliance spend.

Once an appropriate segment is identified to improve compliance (Segment 1 in this example) the second phase of the analytics (compliance optimization) may be performed to further investigate what business units or product categories yield the highest ROI when raising the compliance target from its current level. To execute the compliance optimization, a user can create several compliance optimization scenarios on top of a single advanced visibility scenario by varying the compliance target or by providing investment limits and comparing them on the dashboard to make informed decisions.

FIG. 8 shows a user interface that may be used to create a compliance optimization scenario.

Figure 9:
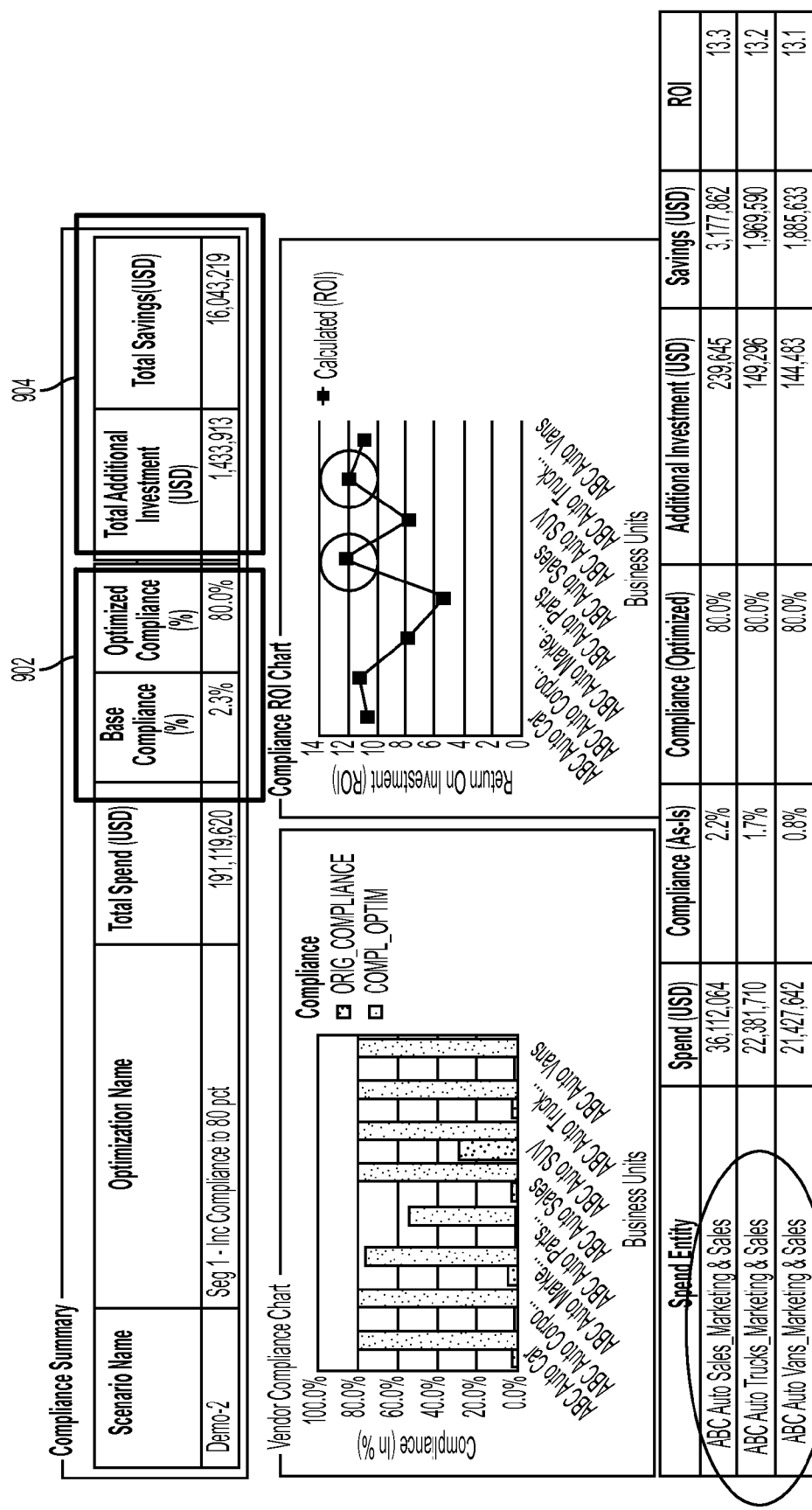
FIG. 9 shows an example of a result of an optimization run in one embodiment of the present disclosure.

The result of the optimization run in the above example is shown in FIG. 9. This report may be generated using the Cognos BI tool. The example report is divided into three sections (summary, compliance and ROI by business units and detailed ROI table). The summary view displays the total spend in Segment 1 (about $191M) along with compliance (green box) 902 and the investment of $1.4M required to attain the 80 percent compliance target for this segment. The total potential savings that can be achieved is approx $16M (shown at 904) which results in the total aggregated ROI of eleven.

The bar chart displays the original compliance and optimized compliance by business units within Segment 1. The optimization chose different compliance targets for the various business units so as to achieve an overall company-wide compliance level of 80 percent (for example Auto Vans compliance is 81%). This allocation depends upon the cost of raising compliance for each business unit from their original level. The optimization engine obtains appropriate inputs for cost and benefit attainable to move up the compliance levels by business units and product category. The line chart on the right displays the ROI by business unit. Business unit "Auto Sales and Auto Truck" provides the highest ROI of 12.2 for this segment. The report displays the ROI for each combination of business unit and product category. For example, in FIG. 9 the ROI for business unit "Auto Sales" and product category "Marketing & Sales" is 13.2. So if it is desired to start with a limited investment, a user can start with the detailed report and select areas to raise compliance within a nominal budget limit 906.

Use Case Summary

Using traditional analysis techniques, the two top non-compliant business units "Auto SUV" and "Van" could have been selected as targets for compliance transformations, although these are not necessary the best selection from an ROI perspective. The CAT tool on the other hand identified the "Auto Sales" and "Truck" divisions as better targets for compliance improvement due to their potential of generating higher ROI. Although not displayed in FIG. 9, the ROI for Auto SUV/Marketing & Sales is 5.5 which is much lower than the ROI of 13.2 for Auto Sales/Marketing & Sales.

In the above example, the average spend per transaction in Segment 1 is about $6,700. In one aspect, this is an important observation coming out of the advanced visibility analytics engine as the compliance is typically enforced at the transaction level. Hence one can treat this average spend for given business units and product category identified in Segment 1 as an initial clip level for automatic approvals when POs are submitted for review. The absence of analytics-driven clip level information could result in setting inappropriate clip levels based on user experience which could lead to either high cost to achieve compliance or spend leakage due to appropriate transactions not being audited.

Businesses that aim to improve their bottom line can take advantage of CAT tool of the present disclosure to increase compliance within the procurement activities of their organization. To enable such analytics, the raw spend data should be complete, e.g., all important fields are available in the spend transactions, and standard data dimensions such as Vendors, Products, are classified correctly. Techniques for data cleansing, data classification, completeness, and data enrichment may be utilized to that end. In another aspect, vendor contract data may be digitized which can provide additional savings opportunities such as back-end rebates, better service levels, by routing spend to vendors that meet contracted spend levels.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for managing spend compliance, comprising:
receiving a set of spend transaction records containing one or more spend attributes;
receiving one or more compliance business rules;
receiving one or more investment scenarios that increase spend compliance;
applying, by a processor, the compliance business rules to said transaction records and determining segments of transactions with predetermined high savings opportunities;
applying, by the processor, said segments of transactions and said investment scenarios; and
generating, by the processor, a prioritized investment plan over one or more time periods that yield optimized return on investment,
wherein a user is allowed to vary selection of dimensions for said determining of the segments of transactions, wherein said segments of transactions have different sets of non-compliant transactions for improvement, and the generated prioritized investment plan comprises one or more different actions depending on the segments of transactions that are created based on said varied dimensions.

2. The method of claim 1, wherein said one or more investment scenarios include one or more optimization models.

3. The method of claim 2, wherein said one or more optimization models include minimizing investment required to achieve a specified compliance target for an organization, maximizing achievable compliance for a given maximum investment budget, or maximizing the return-on-investment given a maximum investment budget and/or minimum compliance target, or combinations thereof.

4. The method of claim 1, wherein said set of spend transaction records include purchase orders and invoices.

5. The method of claim 1, wherein said determining segments of transactions include determining clusters of non-compliant transactions by using clustering techniques in which distance measure used in clustering is log-likelihood, Schwarz Bayesian Criteria to decide when to consider different sets of points to signify different clusters, and after the clusters are identified, computing importance of a feature in each of the clusters by measuring the feature's homogeneity in that cluster.

6. A non-transitory computer readable storage medium storing a program of instructions executable by a machine to perform a method managing spend compliance, comprising:
receiving a set of spend transaction records containing one or more spend attributes;
receiving one or more compliance business rules;
receiving one or more investment scenarios that increase spend compliance;
applying the compliance business rules to said transaction records and determining segments of transactions with predetermined high savings opportunities;
applying said segments of transactions and said investment scenarios; and
generating a prioritized investment plan over one or more time periods that yield optimized return on investment,
wherein a user is allowed to vary selection of dimensions for said determining of the segments of transactions, wherein said segments of transactions have different sets of non-compliant transactions for improvement, and the generated prioritized investment plan comprises one or more different actions depending on the segments of transactions that are created based on said varied dimensions.

7. The computer readable storage medium of claim 6, wherein said one or more investment scenarios include one or more optimization models.

8. The computer readable storage medium of claim 7, wherein said one or more optimization models include minimizing investment required to achieve a specified compliance target for an organization, maximizing achievable compliance for a given maximum investment budget, or maximizing the return-on-investment given a maximum investment budget and/or minimum compliance target, or combinations thereof.

9. The computer readable storage medium of claim 6, wherein said set of spend transaction records include purchase orders and invoices.

10. The computer readable storage medium of claim 6, wherein said determining segments of transactions include determining clusters of non-compliant transactions by using clustering techniques in which distance measure used in clustering is log-likelihood, Schwarz Bayesian Criteria to decide when to consider different sets of points to signify different clusters, and after the clusters are identified, computing importance of a feature in each of the clusters by measuring the feature's homogeneity in that cluster.

11. A system for managing spend compliance, comprising:
a processor;
an information integration service module operable to receive a set of spend transaction records containing one or more spend attributes, and receive one or more compliance business rules;
a visibility analytics module operable to execute on the processor and to apply the compliance business rules to said transaction records and determine segments of transactions with predetermined high savings opportunities;
a compliance analytics module operable to apply said segments of transactions and one or more investment scenarios, and generate a prioritized investment plan over one or more time periods that yield optimized return on investment,
wherein a user is allowed to vary selection of dimensions for determining of the segments of transactions, wherein said segments of transactions have different sets of non-compliant transactions for improvement, and the generated prioritized investment plan comprises one or more different actions depending on the segments of transactions that are created based on said varied dimensions.

12. The system of claim 11, further including a user interface dashboard operable to receive said one or more investment scenarios that increase spend compliance.

13. The system of claim 12, wherein the user interface dashboard is further operable to receive user defined parameters for the visibility analytics module for determining said segments of transactions.

14. The system of claim 11, wherein said one or more investment scenarios include one or more optimization models.

15. The system of claim 14, wherein said one or more optimization models include minimizing investment required to achieve a specified compliance target for an organization, maximizing achievable compliance for a given maximum investment budget, or maximizing the return-on-investment given a maximum investment budget and/or minimum compliance target, or combinations thereof.

16. The system of claim 11, wherein said set of spend transaction records include purchase orders and invoices.

17. The system of claim 11, wherein said determining segments of transactions include determining clusters of non-compliant transactions by using clustering techniques in which distance measure used in clustering is log-likelihood, Schwarz Bayesian Criteria to decide when to consider different sets of points to signify different clusters, and after the clusters are identified, computing importance of a feature in each of the clusters by measuring the feature's homogeneity in that cluster.

\* \* \* \* \*